US007408424B2

(12) United States Patent
Kearns et al.

(10) Patent No.: US 7,408,424 B2

(45) Date of Patent: Aug. 5, 2008

(54) COMPACT RF CIRCUIT WITH HIGH COMMON MODE ATTENUATION

(75) Inventors: Brian Kearns, Dublin (IE); William Verner, Belfast (GB)

(73) Assignee: TDK Corporation, Tokyo (JP)

( * ) Notice: Subject to any disclaimer, the term of this patent is extended or adjusted under 35 U.S.C. 154(b) by 237 days.

(21) Appl. No.: 11/397,859

(22) Filed: Apr. 5, 2006

(65) Prior Publication Data

US 2007/0236305 A1 Oct. 11, 2007

(51) Int. Cl.
*H04B 3/28* (2006.01)

(52) U.S. Cl. .......................... 333/12; 333/81 A; 333/4; 333/156

(58) Field of Classification Search .................. 333/12, 333/4, 138, 139, 140, 156, 24 R, 25, 26, 81 A, 333/81 R See application file for complete search history.

(56) References Cited

U.S. PATENT DOCUMENTS

2005/0140460 A1* 6/2005 Poirier et al. ................ 333/12

* cited by examiner

*Primary Examiner*—Stephen E Jones

(74) *Attorney, Agent, or Firm*—Oliff & Berridge, PLC

(57) ABSTRACT

A compact RF differential circuit has a first differential I/O port comprising a first pair of signal carrying terminals which is connected to a source termination and a second differential I/O port comprising a second pair of signal carrying terminals which is connected to a load termination. The common mode impedance measured at either the first or second differential I/O port is zero. The differential mode impedance measured at the first differential I/O port is equal to the differential mode impedance of the source termination, and the differential mode impedance measured at the second differential I/O port of the circuit is equal to the differential mode impedance of the load termination. The circuit attenuates the common mode component of an RF signal which is incident on the first I/O port of the circuit so that a signal emitted from the second I/O port of the circuit has a differential mode component which is substantially greater than the common mode component and the circuit attenuates the common mode component of an RF signal which is incident on the second I/O port of the circuit so that a signal emitted from the first I/O port of the circuit has a differential mode component which is substantially greater than the common mode component.

15 Claims, 12 Drawing Sheets

COMPACT RF CIRCUIT WITH HIGH COMMON MODE ATTENUATION

CROSS-REFERENCES

The present application is related to co-filed application Ser. No. 11/397,860 entitled "Miniaturised Half-wave Balun".

FIELD OF THE INVENTION

This invention relates to a compact RF circuit with High Common Mode Attenuation.

BACKGROUND

Conventional electronic circuits for RF and telecommunications applications comprise one or more input ports to which input RF signals of the electronic circuit are fed, and one or more output ports from which output RF signals of the electronic circuit are emitted. Single-ended input/output ports have a pair of connection terminals: a signal terminal and a ground terminal, where the input and output RF signals of the electronic circuit are carried on the signal terminal and where the ground terminal provides a reference against which the RF signal on the signal terminal is defined.

In RF and telecommunications applications it is sometimes preferable to employ electronic circuits where the input/output (hereinafter referred to as I/O) ports of the device comprise a pair of signal carrying terminals where each terminal carries part of an input or output electrical signal of the electronic circuit.

The pair of RF signals carried on each terminal described above can be individually referenced to ground, or can be described mathematically as a linear combination of two signals: a differential mode signal and a common mode signal. A differential mode signal is divided between two terminals so that the amplitude of the signal on each terminal is the same, and so that there is a phase difference of 180° between both signals; thus, the two parts of a differential signal carried on a pair of terminals are out of phase. A common mode signal is divided across two terminals so that the amplitude of the signal on each terminal is the same, and so that both signals are in phase; thus, the two parts of a common mode signal carried on a pair of terminals are identical.

Differential mode signals are less susceptible to noise than common mode signals and consequently differential mode signals are often preferred for applications where a very high signal to noise ration is required.

RF circuits comprising a pair of terminals for each I/O port of the circuit are usually designed to process differential signals and are usually referred to as differential circuits. Sometimes RF circuits comprising a pair of terminals for each I/O port of the circuit are referred to as "balanced circuits".

A procedure for the analysis of differential circuits, differential components and differential devices is outlined by D. E. Brockelman, W. R. Eisenstadt; "*Combined Differential and Common-Mode Scattering Parameters: Theory and Simulation*"; IEEE Transactions on Microwave Theory and Techniques, Vol. 43, No. 7, July 1995, pp 1530-1539. According to Brockelman, a differential circuit can be evaluated in terms of the single ended s-parameters which are determined at each signal carrying terminal of the circuit or between any pair of signal carrying terminals of the circuit. A linear transform is used to give what are known as the mixed mode s-parameters of the differential circuit.

For an electronic circuit with two differential I/O ports, the mixed mode S-matrix $S_{MM}$ is defined by EQUATION 1.

EQUATION 1

| | Differential Mode Stimulous | | Common Mode Stimulous | | |
|---|---|---|---|---|---|
| $S_{MM} =$ | $S_{DD11}$ | $S_{DD12}$ | $S_{DC11}$ | $S_{DC12}$ | Differential Mode Response |
| | $S_{DD21}$ | $S_{DD22}$ | $S_{DC21}$ | $S_{DC22}$ | |
| | $S_{CD11}$ | $S_{CD12}$ | $S_{CC11}$ | $S_{CC12}$ | Common Mode Response |
| | $S_{CD21}$ | $S_{CD22}$ | $S_{CC21}$ | $S_{CC22}$ | |

The linear transformation from the single ended s-parameters to the mixed mode s-parameters for a two port differential circuit is given in EQUATION 2.

EQUATION 2

$$S_{MM}=\begin{pmatrix}\frac{1}{2}(S_{11}-S_{12}-S_{21}+S_{22}) & \frac{1}{2}(S_{13}-S_{14}-S_{23}+S_{24}) & \frac{1}{2}(S_{11}+S_{12}-S_{21}-S_{22}) & \frac{1}{2}(S_{13}+S_{14}-S_{23}-S_{24})\\ \frac{1}{2}(S_{31}-S_{32}-S_{41}+S_{42}) & \frac{1}{2}(S_{33}-S_{34}-S_{43}+S_{44}) & \frac{1}{2}(S_{31}+S_{32}-S_{41}-S_{42}) & \frac{1}{2}(S_{33}+S_{34}-S_{43}-S_{44})\\ \frac{1}{2}(S_{11}-S_{12}+S_{21}-S_{22}) & \frac{1}{2}(S_{13}-S_{14}+S_{23}-S_{24}) & \frac{1}{2}(S_{11}+S_{12}+S_{21}+S_{22}) & \frac{1}{2}(S_{13}+S_{14}+S_{23}+S_{24})\\ \frac{1}{2}(S_{31}-S_{32}+S_{41}-S_{42}) & \frac{1}{2}(S_{33}-S_{34}+S_{43}-S_{44}) & \frac{1}{2}(S_{31}+S_{32}+S_{41}+S_{42}) & \frac{1}{2}(S_{33}+S_{34}+S_{43}+S_{44})\end{pmatrix}$$

EQUATION 1 shows that a two port differential circuit can be analysed using a similar method to that employed for a two port single-ended circuit, except that for a two port differential circuit of there are four 2×2 matrices of s-parameters instead of one 2×2 matrix due to the fact that the circuit can be driven at port 1 by a differential mode stimulus or a common mode stimulus, and because the response at port 2 can be either a differential mode response or a common mode response.

Differential circuits can be adversely affected if an input signal of the circuit contains a high common mode component. In many cases a differential circuit will pass a common mode signal from the input of the circuit to the output of the circuit; this would be characterized by a large value of $S_{CC21}$ for the circuit.

Differential circuits which are fed differential input signals sometimes introduce an unwanted common mode component in the output signals; this is referred to as mode conversion, and would be characterized by a large value of the term $S_{CD21}$ for the circuit.

An ideal differential output circuit will produce output signals which have no common mode component at all; however, an acceptable performance level for most applications is that the common mode component of the output signal is at least 30 dB less than the differential mode component of the output. This performance level is usually only required within the operating band of the differential circuit.

Unfortunately it is often the case that differential circuits produce output signals with a higher ratio of common mode to differential mode than −30 dB.

FIG. 1 shows a block diagram of a differential circuit 10 comprising a pair of differential I/O ports P1, P2, where I/O port P1 comprises a pair of signal carrying terminals T1, T2 and where I/O port P2 comprises a pair of signal carrying terminals T3, T4. A circuit network 12 is connected between I/O port P1 and port and I/O port P2. The electronic circuit 10 is terminated at the I/O port P1 by a source termination 11, which is characterized by a differential mode impedance $Z_{DS}$ and a common mode impedance $Z_{CS}$, and is terminated at the I/O port P2 by a load termination 13 which is characterized by a differential mode impedance $Z_{DL}$ and a common mode impedance $Z_{CL}$.

If it is assumed that the differential circuit 10 of FIG. 1 is symmetric about the axis 15, then the following identities apply:

$$S_{21}=S_{12},\ S_{43}=S_{34};$$

$$S_{32}=S_{41},\ S_{31}=S_{41};$$

$$S_{11}=S_{22},\ S_{33}=S_{44}.$$

In this case the mixed mode s-matrix of EQUATION 2 can be simplified to that of EQUATION 3.

EQUATION 3

$S_{MM} =$

| Differential Mode Stimulous | | Common Mode Stimulous | | |
|---|---|---|---|---|
| $S_{DD11}$ | $S_{DD12}$ | 0 | 0 | Differential Mode Response |
| $S_{DD21}$ | $S_{DD22}$ | 0 | 0 | |
| 0 | 0 | $S_{CC11}$ | $S_{CC12}$ | Common Mode Response |
| 0 | 0 | $S_{CC21}$ | $S_{CC22}$ | |

The differential circuit 10 of FIG. 1 presents a differential mode impedance and a common mode impedance at I/O port P1, and presents a differential mode impedance and a common mode impedance at I/O port P2. If the circuit is assumed to be symmetric as described by EQUATION 3, then the differential mode impedance at I/O port P1 which is represented by $Z_{D1}$ and the common mode impedance at I/O port P1 which is represented by $Z_{C1}$ can be defined in terms of the mixed mode s-parameters as follows:

$$Z_{D1} = Z_{DS} \times \left(\frac{1+S_{DD11}}{1-S_{DD11}}\right) \qquad \text{EQUATION 4}$$

$$Z_{C1} = Z_{CS} \times \left(\frac{1+S_{CC11}}{1-S_{CC11}}\right)$$

where $Z_{DS}$, $Z_{CS}$ are the respective differential mode and common mode impedances of the source 11.

Similarly the differential mode impedance at I/O port P2 $Z_{D2}$ and the common mode impedance at I/O port P2 $Z_{C2}$ are defined in terms of the mixed mode s-parameters as follows:

$$Z_{D2} = Z_{DL} \times \left(\frac{1+S_{DD22}}{1-S_{DD22}}\right) \qquad \text{EQUATION 5}$$

$$Z_{C2} = Z_{CL} \times \left(\frac{1+S_{CC22}}{1-S_{CC22}}\right)$$

where $Z_{DL}$, $Z_{CL}$ are the respective differential mode and common mode impedances of the load 13.

It can be seen from equations 4 and 5 that the differential mode impedance presented by I/O port P1 of the differential circuit 10 is matched to the differential mode impedance $Z_{DS}$ of the source 11 and that the differential mode impedance presented by I/O port P2 of the differential circuit 10 is matched to the differential mode impedance $Z_{DL}$ of the load 13 when the relationships of EQUATION 6 apply.

$$S_{DD11}=0 \rightarrow Z_{D1}=Z_{DS}$$

$$S_{DD22}=0 \rightarrow Z_{D2}=Z_{DL} \qquad \text{EQUATION 6}$$

If EQUATION 6 applies, and if the circuit of FIG. 1 is lossless, differential mode signals which are incident on I/O port P1 will be passed without attenuation to I/O port P2 and differential mode signals which are incident on I/O port P2 will be passed without attenuation to I/O port P1.

The circuit of FIG. 1 will block common mode signals from being transmitted from I/O port P1 to I/O port P2 (and vice versa) when the common mode impedances at ports P1 and P2 are respectively zero Ω.

It can also be seen from equations 4 and 5, that the common mode impedances presented by I/O ports P1 and P2 of the differential circuit 10 become zero under the following conditions.

$$S_{CC11} = -1 \rightarrow Z_{C1} = 0$$

$$S_{CC22} = -1 \rightarrow Z_{C2} = 0 \quad \text{EQUATION 7}$$

For a lossless device, the scalar product of any rows or columns of the s-matrix must be unity. Combining this property with EQUATION 3, EQUATION 6 and EQUATION 7 gives the following mixed mode s-matrix for a two port differential circuit which passes the differential mode component of a signal incident on an input port of the circuit to an output port of the circuit without attenuation, and which presents a common mode impedance of zero Ω to a signal incident on an input port of the circuit, thereby blocking the common mode component of the signal from an output port of the circuit.

$$S_{MM} = \left( \begin{array}{cc|cc} \multicolumn{2}{c}{\text{Differential}} & \multicolumn{2}{c}{\text{Common}} \\ \multicolumn{2}{c}{\text{Mode Stimulous}} & \multicolumn{2}{c}{\text{Mode Stimulous}} \\ 0 & 1 & 0 & 0 \\ 1 & 0 & 0 & 0 \\ \hline 0 & 0 & -1 & 0 \\ 0 & 0 & 0 & -1 \end{array} \right) \begin{array}{l} \text{Differential} \\ \text{Mode Response} \\ \text{Common} \\ \text{Mode Response} \end{array}$$

EQUATION 8

From EQUATION 1, the corresponding single-ended S matrix can be derived.

$$S_{SE} = \begin{pmatrix} -1/2 & -1/2 & +1/2 & -1/2 \\ -1/2 & -1/2 & -1/2 & +1/2 \\ +1/2 & -1/2 & -1/2 & -1/2 \\ -1/2 & +1/2 & -1/2 & -1/2 \end{pmatrix} \quad \text{EQUATION 9}$$

Thus the required properties of a two port differential circuit which passes a differential signal incident on an input port of the circuit without attenuation to an output port of the circuit and which blocks a common mode signal which is incident on an input port of the circuit thereby preventing the common mode signal from being passed to an output port of the circuit are given in EQUATIONS 6 and 7, and the corresponding s-matrices are given in EQUATION 8 and 9.

FIG. 2 shows a block diagram of an electronic circuit 20 comprising a first differential I/O port P1, and a second differential I/O port P2, where the first differential I/O port P1 comprises a pair of signal carrying terminals T1 and T2, and where the second differential I/O port P2 comprises a pair of signal carrying terminals T3 and T4. A transmission line element 24 is arranged so that a first end of the transmission line element 24 is connected to a first circuit node 23A, and so that a second end of the transmission line element 24 is connected to a second circuit node 23B. Signal carrying terminals T1 and T3 are connected to first circuit node 23A and signal carrying terminals T2 and T4 are connected to second circuit node 23B. The electronic circuit has a given operating band defined by a lower frequency limit $F_L$ and an upper frequency limit $F_U$. The transmission line element has an electrical length E which is equal to 180° (one half wavelength) at the centre of the operating band of the electronic circuit The same circuit is depicted in FIG. 7 of U.S. Pat. No. 6,900,705, Nakamura.

The circuit of FIG. 2 has the required electrical properties when the source impedance is equal to the load impedance, i.e. the differential mode component of an electrical signal incident on I/O port P1 is passed substantially without attenuation to I/O port P2 of the electronic circuit, and the common mode component of the impedance of I/O port P1 of the electronic circuit is zero Ω, so that the common mode component of an electrical signal incident on I/O port P1 is blocked from I/O port P2; similarly the differential mode component of an RF signal incident on I/O port P2 is passed substantially without attenuation to I/O port P1, and the common mode component of the impedance of I/O port P2 of the electronic circuit is zero Q, so that the common mode component of an RF signal incident on I/O port P2 is blocked from I/O port P1.

Despite having the required electrical properties, the circuit of FIG. 2 is impractical for use in miniaturized electronic appliances such as portable cellular handsets or W-LAN modules due to the very large physical dimensions of the half wavelength transmission line 24. For example, at an operating frequency of 2.45 GHz, the centre of the band specified in IEEE 802.11b/g for W-LAN applications, a half wavelength transmission line will have a length of 61.22 mm in air and will have an electrical length given by the expression below for a transmission line fabricated in a dielectric material.

$$\left. \frac{\lambda}{2} \right|_{f=2.45 \text{ GHz}} = \frac{61.22}{\sqrt{\varepsilon_r}} \text{ mm}$$

where $\varepsilon_r$ is the relative dielectric constant of the material.

Nakamura describes a number of two port differential circuits for attenuating the common mode component of a signal incident on an input port of the circuit comprising multiple discrete components (FIGS. 8, 9 10, 11, 12, 13). However, each of the embodiments described in Nakamura suffer from two drawbacks.

The first drawback is that in order that each of the circuits have the required electrical properties, i.e. that the common mode impedance is zero within the operating band of the circuit, and that the differential mode impedance is matched to the termination at the source or the load of the component, two of the component values must become infinitely large. For example in FIG. 9, the values of capacitors Cg1 and Cg2 must approach infinity in order to reduce the common mode impedance of the circuit to zero, and moreover increasing the capacitance of capacitors Cg1 and Cg2 to sufficiently large values requires that the inductance of inductor Lb become impractically small.

Similarly in FIG. 10 of Nakamura the values of inductors Lg1 and Lg2 become infinitely large in order that the differential mode impedance presented by the circuit is matched to the termination at the source or the load. This reduced the required capacitance of capacitor Cb so that it becomes infinitesimally small.

FIG. 3 shows a two port differential circuit 30 for attenuating the common mode component of a signal incident on an I/O port P1 or P2 of the circuit where the circuit comprises a PI-type discrete circuit connected in parallel with the I/O port P1 and connected in parallel with the I/O port P2 of the circuit similar to the circuit of Nakamura FIG. 9. The PI-type discrete circuit comprises shunt capacitors 36A, 36B, and series inductor 38. FIG. 4A shows the differential mode reflection coefficient ($S_{DD11}$) and the common mode reflection co-efficient ($S_{CC11}$) of the circuit of FIG. 3 plotted on a Smith chart for the case where the capacitances of capacitors 36A and 36B are both 10 pF and for the case where the differential mode impedances of the source and load are both 100Ω. The resulting common mode impedance at 2.45 GHz is 25×(0.0166−j0.1278)Ω, and the required inductance of inductor 38 so that the differential mode impedance of the circuit 30 is matched to the source at I/O port P1 and is matched to the load at I/O port P2 is 0.422 nH at an operating frequency of 2.45 GHz.

FIG. 4B shows a plot of the differential mode response ($S_{DD21}$) and the common mode response ($S_{CC21}$) of the circuit of FIG. 3 for the case where the capacitances of capacitors 36A and 36B are both 10 pF as described above. The differential mode insertion loss in the frequency range from 2.4 GHz to 2.5 GHz is less than 0.2 dB which is a good result; however, the minimum common mode rejection of the circuit in the frequency range from 2.4 GHz to 2.5 GHz is 12 dB approximately; this is not sufficiently high for typical RF applications.

FIG. 4C shows a Smith chart plot of the differential mode reflection coefficient ($S_{DD11}$) and the common mode reflection co-efficient ($S_{CC11}$) of the circuit of FIG. 3 for the case where the capacitances of capacitors 36A and 36B are both 20 pF. The resulting common mode impedance at 2.45 GHz is 25×(0.0042−j0.0647)Ω, and the required inductance of inductor 38 so that the differential mode impedance is matched to the source at I/O port P1 and is matched to the load at I/O port P2 (100 Ohms) is 0.211 nH at an operating frequency of 2.45 GHz. Such a small inductance is very difficult to consistently realize in a mass production environment.

The second drawback of each of the circuits described in FIGS. 8, 9, 10, 11 and 12 of Nakamura is that they all require at least one inductive element. Unfortunately, if the circuit is to be fabricated using multilayer technology employing materials with a high dielectric constant, such as low temperature co-fired ceramic (LTCC), the realization of high Q inductors is difficult, and the insertion loss of the circuit becomes high.

For example multilayer LTCC substrates with a layer thickness of 40 μm and a dielectric constant of 75 are typical for RF applications at 2.45 GHz. The resulting capacitance between mutual windings of an inductor is sufficiently large to lower the self resonant frequency of the inductor to a frequency well below 2.45 GHz.

Other prior art solutions for attenuating a common mode component of an RF signal such as U.S. Pat. No. 6,940,369; "Surface acoustic wave device having excellent balancing characteristics between balanced terminals and a communication device using the same", Nakahashi, and U.S. Pat. No. 6,919,781: "Surface wave filter comprising reactance elements", Baier, deal with specific topologies for acoustic filters, and hence cannot be used in the general case where a circuit is required which has the function of passing a differential mode component of an RF signal and blocking a common mode component of the same signal.

SUMMARY OF THE INVENTION

The present invention provides a compact RF differential circuit according to claim 1.

It is preferable if the circuit can be fabricated using a combination of short transmission lines and capacitors.

BRIEF DESCRIPTION OF THE DRAWINGS

Embodiments of the invention will now be described, by way of example, with reference to the accompanying drawings, in which.

DESCRIPTION OF THE PREFERRED EMBODIMENTS

In the accompanying figures, the same labels are used to denote I/O ports and signal carrying terminals in line with the convention in RF circuitry nomenclature to number RF ports and terminals sequentially starting at one.

Figure 1:
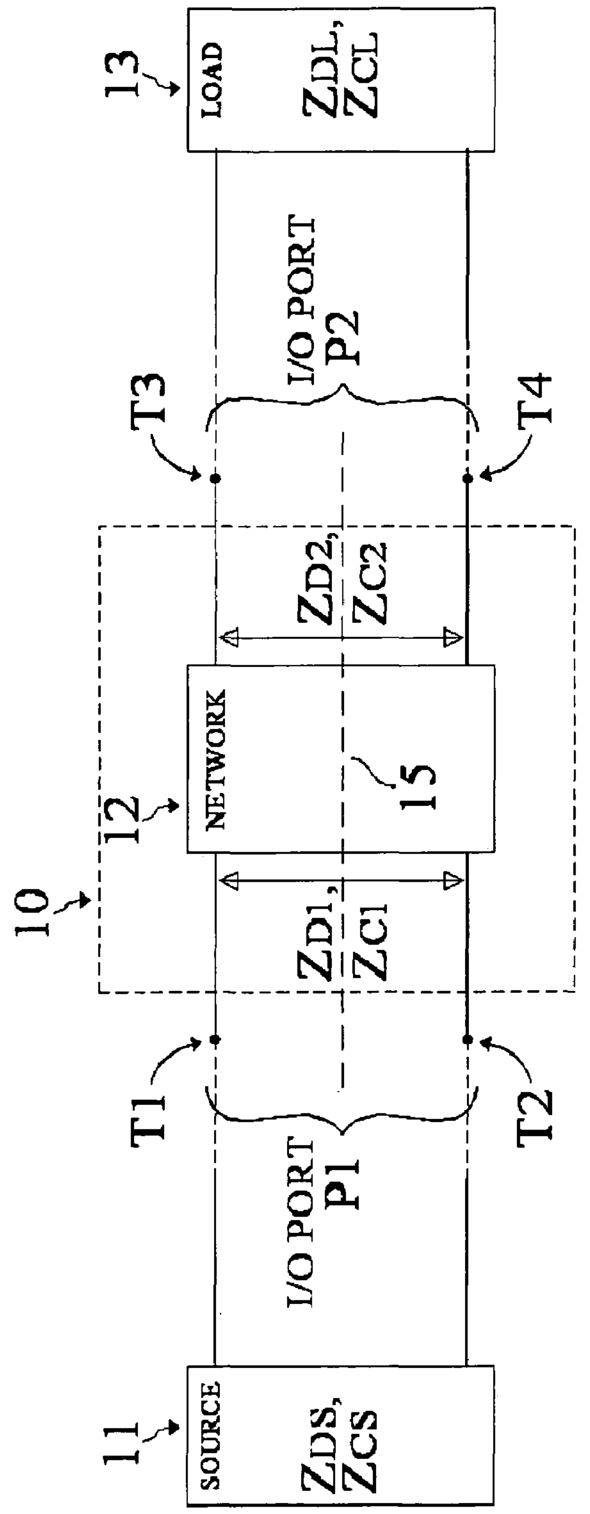
FIG. 1 is a block diagram of a conventional 2 port differential circuit.
Figure 2:
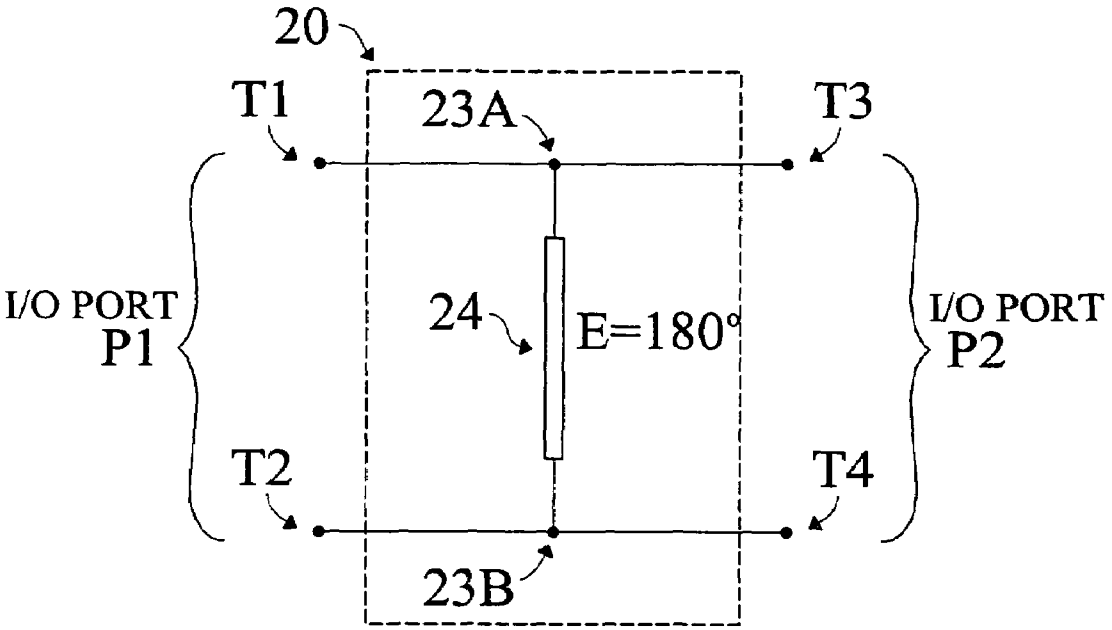
FIG. 2 shows a conventional RF differential circuit with high common mode attenuation comprising a half wavelength transmission line.
Figure 3:
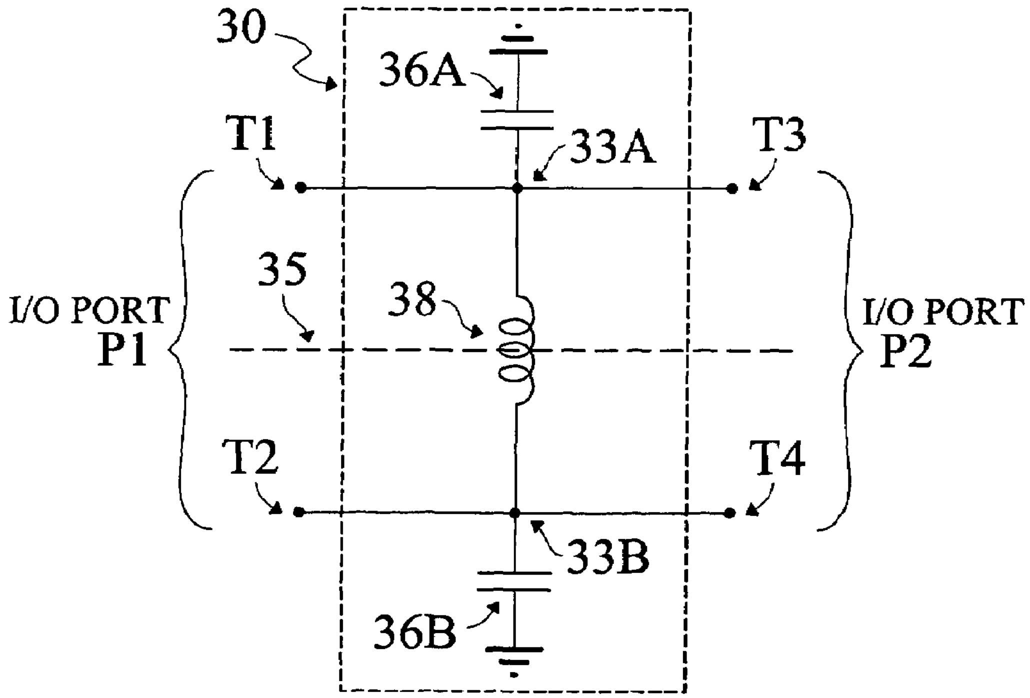
FIG. 3 shows an RF differential circuit with high common mode attenuation according U.S. Pat. No. 6,900,705.
Figure 4A:
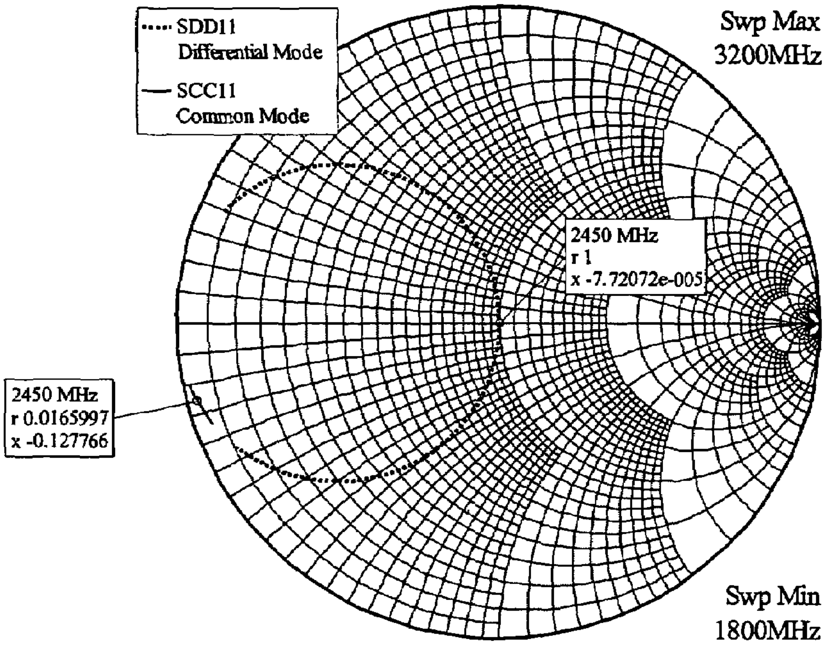
FIG. 4A shows an exemplary differential mode reflection coefficient and common mode reflection coefficient for the circuit of FIG. 3.
Figure 4B:
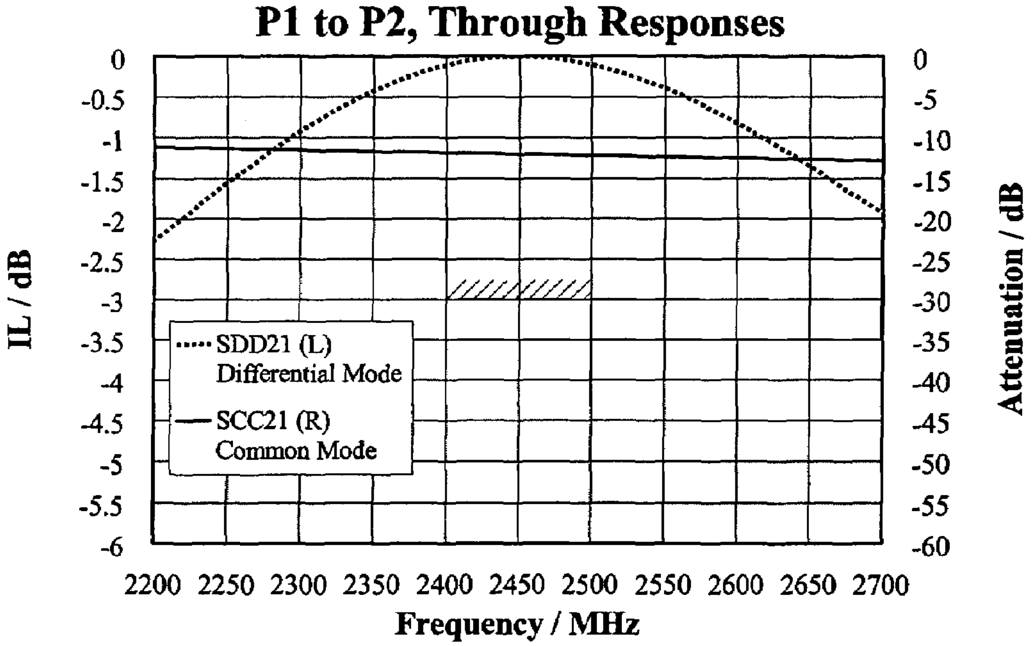
FIG. 4B shows an exemplary differential mode response and common mode response for the circuit of FIG. 3.
Figure 4C:
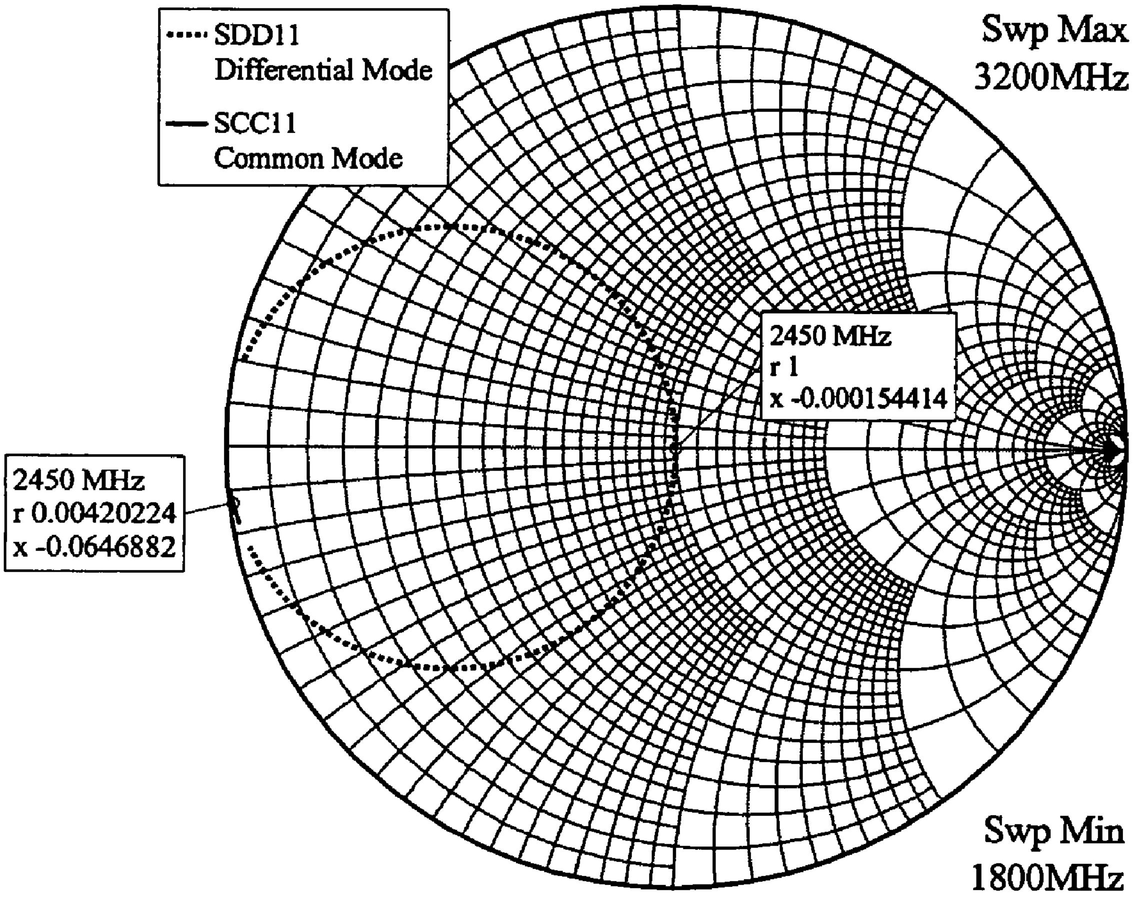
FIG. 4C shows another exemplary differential mode reflection coefficient and common mode reflection coefficient for the circuit of FIG. 3.
Figure 5:
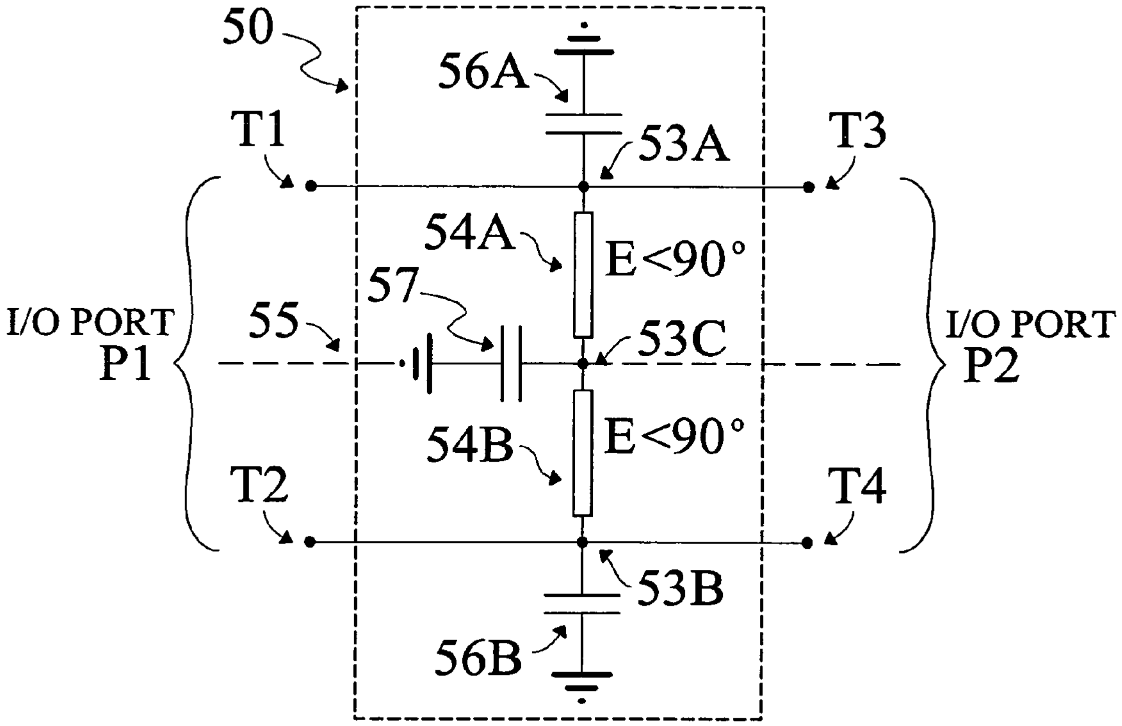
FIG. 5 shows a compact RF differential circuit with high common mode attenuation according to a preferred embodiment of the present invention.

FIG. 5 shows a preferred embodiment of a compact RF differential circuit 50 with high common mode attenuation according to a preferred embodiment of the present invention. As before, the circuit of FIG. 5 comprises a first differential I/O port P1 comprising a first pair of signal carrying terminals T1 and T2, and a second differential I/O port P2 comprising a second pair of signal carrying terminals T3 and T4. The RF differential circuit 50 has a given operating band defined by a lower frequency limit $F_L$ and an upper frequency limit $F_U$. Signal carrying terminals T1 and T3 are connected to a first circuit node 53A of the differential circuit 50, shunt capacitor 56A is also connected to first circuit node 53A, and a first end of a transmission line 54A of a given characteristic impedance is also connected to first circuit node 53A. Signal carrying terminals T2 and T4 are connected to a second circuit node 53B of the differential circuit 50, shunt capacitor 56B is also connected to second circuit node 53B, and a first end of a transmission line 54B of a given characteristic impedance is also connected to second circuit node 53B. The second ends of transmission lines 54A and 54B are both connected to a third circuit node 53C of the differential circuit 50, a shunt capacitor 57 is also connected to third node 53C. The circuit elements are chosen to be symmetric about an axis of symmetry 55 of the circuit 50, so that capacitor 56A has the same capacitance as capacitor 56B, and transmission line 54A has the same electrical length and characteristic impedance as transmission line 54B. The electrical lengths E of transmission lines 54A and 54B are both substantially less than 90° at the centre of the operating band of the circuit.

The circuit of FIG. 5 can be analyzed using an even mode and odd mode analysis similar to that laid out by David M Pozar; "*Microwave Engineering*"; 2nd Edition; Wiley 1998; ISBN 0-471-17096-8; pp 206-209. The analysis involves finding an axis of symmetry through the component 50 by dividing capacitor 57 into two equal parallel connected capacitors where each parallel connected capacitor has half the capacitance of capacitor 57 of FIG. 5.

Figure 6A:
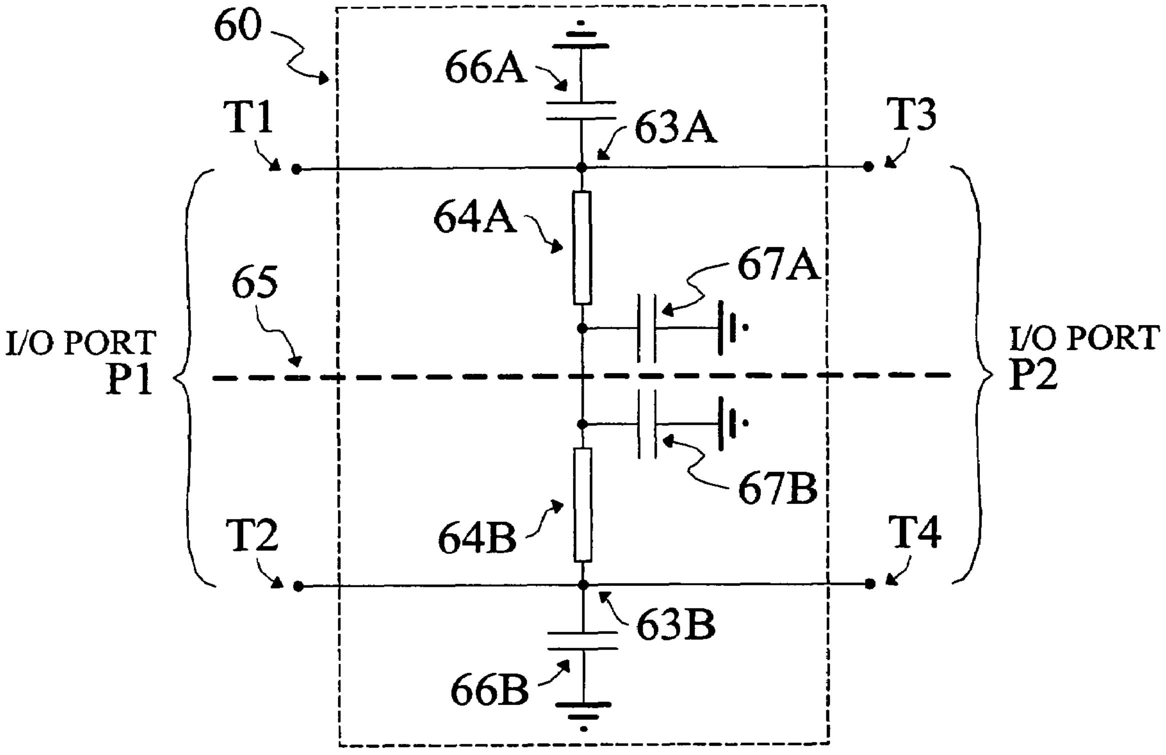
FIG. 6A shows a modified version of the circuit of FIG. 5 for even mode and odd mode analysis.

FIG. 6A depicts a circuit which is identical to the circuit of FIG. 5 except that two parallel connected capacitors 67A and 67B on either side of an axis of symmetry 65 replace the single capacitor 57 of FIG. 5.

Figure 6B:
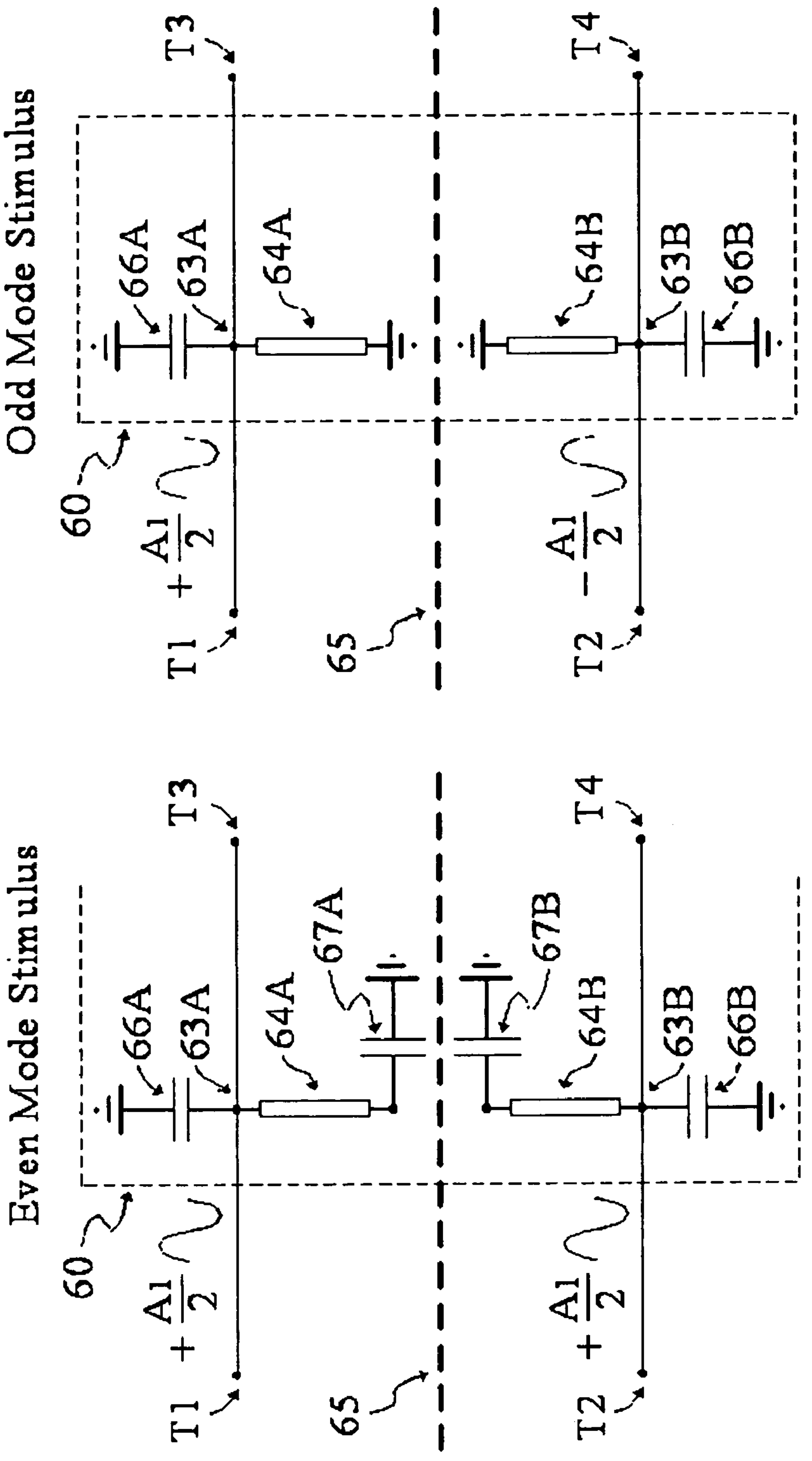
FIG. 6B shows even mode (left) and odd mode (right) analysis of the circuit of FIG. 6A.

FIG. 6B, (left) depicts the circuit of FIG. 6A when subject to an even mode stimulus at Port P1 and (right) depicts the circuit of FIG. 6A when subject to an odd mode stimulus at Port P1. For the criteria of EQUATION 6 to apply, and assuming that the source impedance is equal to the load impedance, the total admittance due to the circuit branch containing grounded transmission line 64A of FIG. 6B (right) and the circuit branch containing capacitor 66A of FIG. 6B (right) both of which are connected to circuit node 63A should be equal to zero.

i.e.

$$j\omega C_{66A} = \frac{j}{Z_0 \tan\left(\frac{2\pi}{\lambda}L\right)} \qquad \text{EQUATION 10}$$

where $Z_0$ and L are the respective characteristic impedance and the physical length of transmission line 64A, $C_{66A}$ is the capacitance of capacitor 66A, ω is the angular frequency of a signal in the centre of the operating band of the circuit, and λ is the wavelength of that signal.

For the criteria of EQUATION 7 to apply, the impedance from circuit node 63A of FIG. 6B (left) to ground via the circuit branch containing transmission line 64A and capacitor 67A must be zero.

i.e.

$$Z_0\left[\frac{\frac{-j}{\omega C_{67A}} + jZ_0\tan\left(\frac{2\pi}{\lambda}L\right)}{Z_0 + \frac{1}{\omega C_{67A}}\tan\left(\frac{2\pi}{\lambda}L\right)}\right] = 0 \qquad \text{EQUATION 11}$$

where $C_{67A}$ is the capacitance of capacitor 67A.

EQUATION 11 can be rearranged to give the following expression $$\frac{j}{\omega C_{67A}} = jZ_0\tan\left(\frac{2\pi}{\lambda}L\right) \qquad \text{EQUATION 12}$$

From EQUATIONS 10 and 12 it can be seen that for the circuit of FIG. 6A to have the required properties, the capacitance of capacitor 66A should be equal to that of capacitor 67A, and similarly the capacitance of capacitor 66B should be equal to that of capacitor 67B.

EQUATIONS 10 and 12 also imply that capacitors 56A, 56B and 57 of the differential circuit 50 of FIG. 5 are related by the following formula.

$$C_{56A} = C_{56B} = \frac{C_{57}}{2} \qquad \text{EQUATION 13}$$

where $C_{56A}$, $C_{56B}$ and $C_{57}$ are the capacitances of capacitors 56A, 56B and 57 respectively.

Figure 7A:
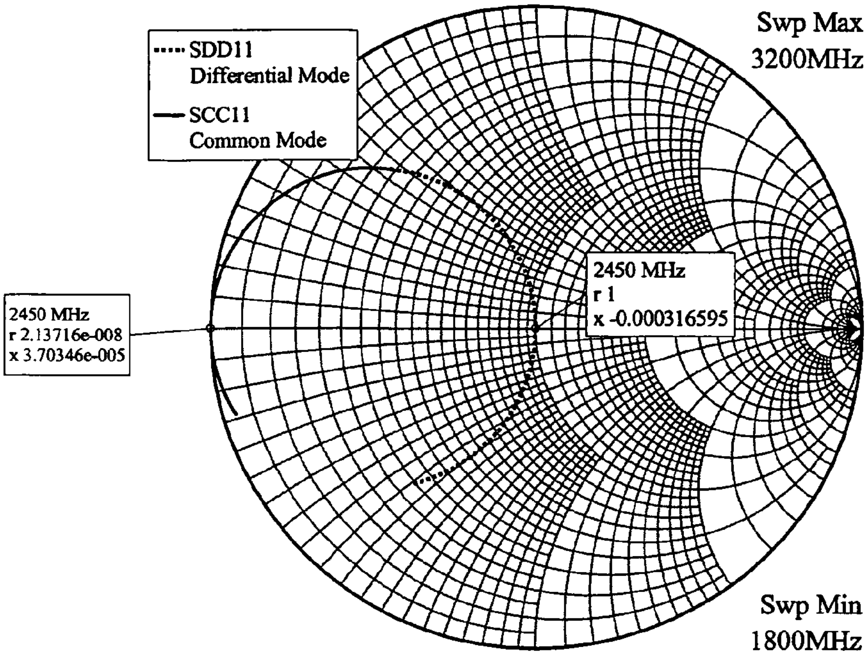
FIG. 7A shows an exemplary differential mode reflection coefficient and common mode reflection coefficient for the circuit of FIG. 5.

FIG. 7A shows a Smith chart plot of the differential mode reflection coefficient ($S_{DD11}$) and the common mode reflection coefficient ($S_{CC11}$) of the circuit of FIG. 5 for the case where the differential mode component of the source impedance is 100Ω the common mode component of the source impedance is 25Ω and for the case where the differential mode component of the load impedance is also 100Ω and the common mode component of the load impedance is 25Ω.

For the plot of FIG. 7A the following additional electrical properties are applied to the differential circuit of FIG. 5:

$$C_{56A} = C_{56B} = \frac{C_{57}}{2} = 3.57 \text{ pF};$$

the characteristic impedances of transmission lines 54A and 54B are both of 50Ω and the electrical lengths E of transmission lines 54A and 54B are both 20° at an operating frequency of 2.45 GHz.

It can be seen from FIG. 7A that the resulting common mode impedance of the RF differential circuit 50 at I/O port P1 is approximately zero Ω at 2.45 GHz. Similarly, the differential mode impedance of the RF differential circuit 50 at I/O port P1 is matched to the differential mode component of the source impedance. By symmetry, it can be deduced that the common mode impedance of the RF differential circuit 50 at I/O port P2 is also zero Ω and that the differential mode impedance of the RF differential circuit 50 at I/O port P2 is matched to the differential mode component of the load impedance.

Thus, RF differential circuit 50 has the required properties given in EQUATIONS 6, and 7, and hence can be represented by the s-matrices given in EQUATION 8 and 9.

Figure 7B:
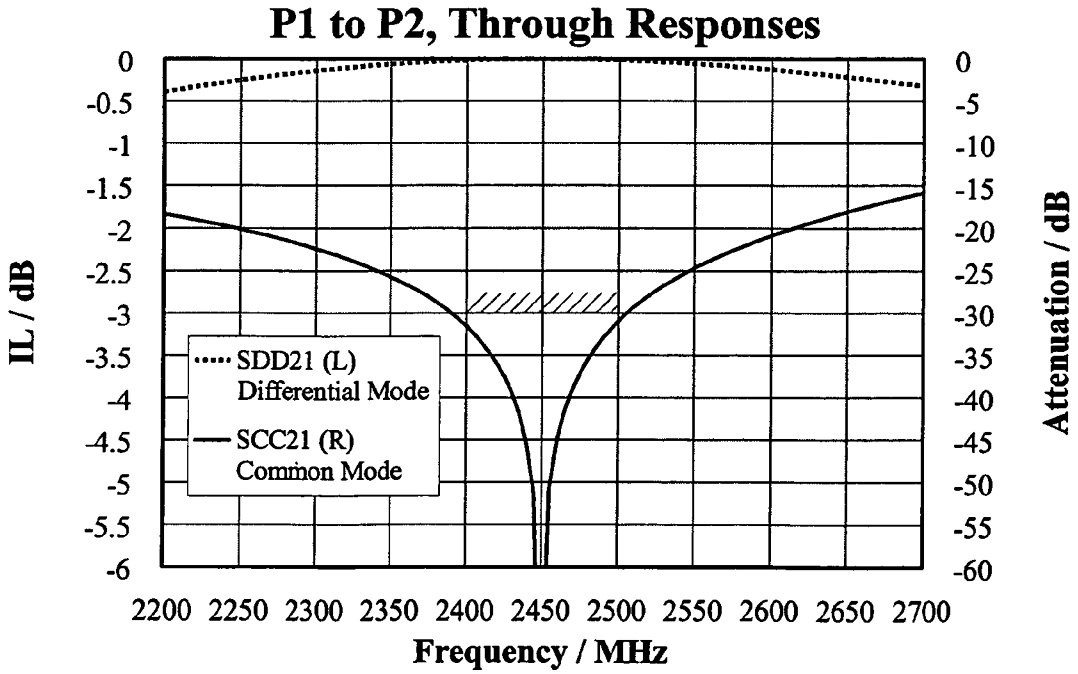
FIG. 7B shows an exemplary differential mode response and common mode response for the circuit of FIG. 5.

FIG. 7B shows the differential mode response ($S_{DD21}$) and the common mode response ($S_{CC21}$) of the circuit of FIG. 5 under the same conditions as FIG. 7A. The maximum differential mode insertion loss from 2.4 GHz to 2.5 GHz is 0.1 dB, and the common mode attenuation of the circuit from 2.4 GHz to 2.5 GHz is greater than 30 dB which is sufficiently high for most typical RF applications.

Figure 8:
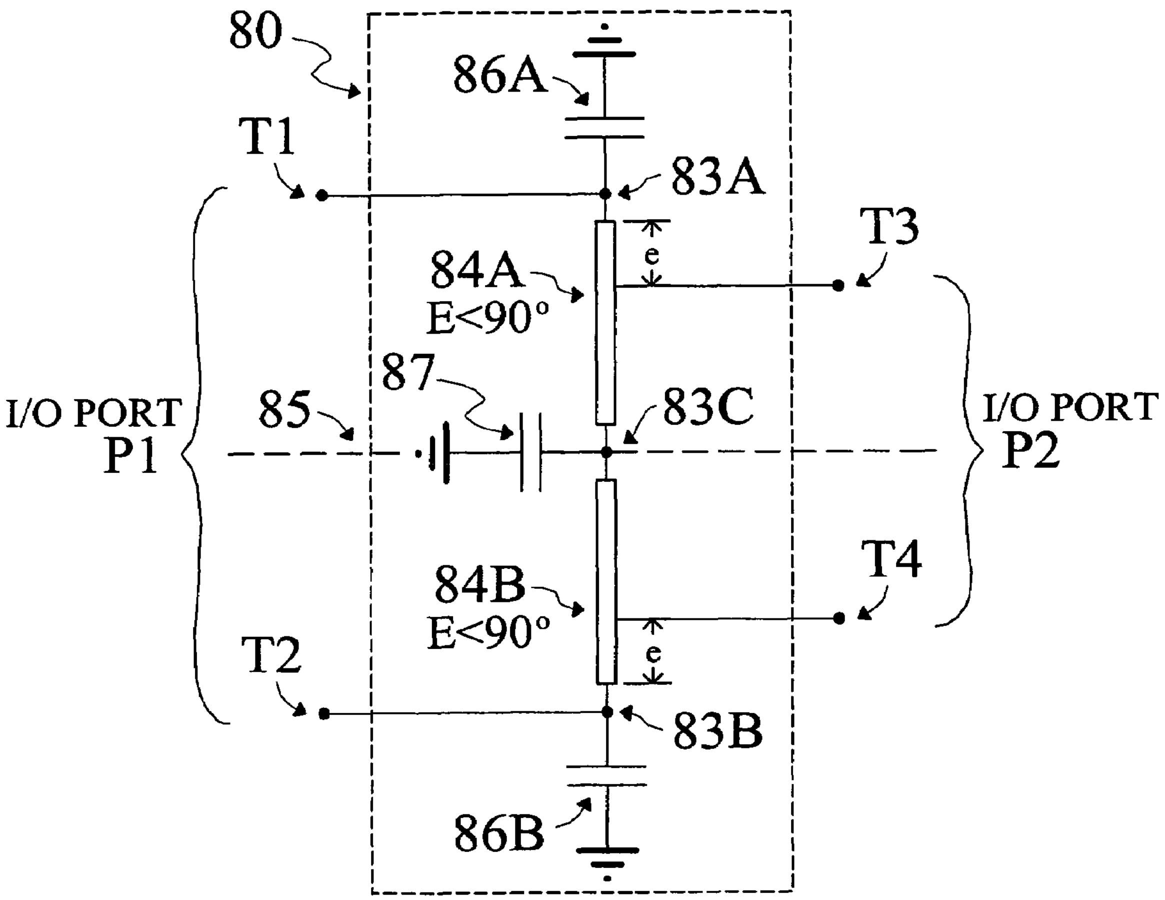
FIG. 8 shows a compact RF differential circuit with high common mode attenuation and featuring impedance transformation according to a second embodiment of the present invention.

FIG. 8 shows a compact RF differential circuit 80 with high common mode attenuation according to a second embodiment of the present invention. As before, the circuit of FIG. 8 comprises a first differential I/O port comprising a first pair of signal carrying terminals T1 and T2, and a second differential I/O port comprising a second pair of signal carrying terminals T3 and T4. Signal carrying terminal T1 is connected to a first circuit node 83A of the differential circuit 80, shunt capacitor 86A is also connect to first circuit node 83A and a first end of a transmission line of a given characteristic impedance 84A is also connected to first circuit node 83A. Signal carrying terminal T2 is connected to a second circuit node 83B of the differential circuit 80, shunt capacitor 86B is also connected to second circuit node 83B of the differential circuit 80 and a first end of a transmission line of a given characteristic impedance 84B is also connected to second circuit node 83B. The second ends of transmission lines 84A and 84B are both connected to a third node 83C of the differential circuit 80, and shunt capacitor 87 is also connected to third circuit node 83C. The circuit elements are chosen to be symmetric about an axis of symmetry of the circuit 85, so that capacitor 86A has substantially the same capacitance as capacitor 86B, and so that transmission line 84A has substantially the same electrical length and characteristic impedance as transmission line 84B. The electrical length E of transmission line 84A and that of 84B is substantially less than 90° at the centre of the operating band of the circuit. Signal carrying terminal T3 is connected at a point along the length of transmission line 84A and between first circuit node 83A and third circuit node 83C at a distance e from first circuit node 83A, and signal carrying terminal T4 is connected at a point along the length of transmission line 84B and between second circuit node 83B and third circuit node 83C at a distance e from second circuit node 83B.

By connecting signal carrying terminal T3 at a point along transmission line 84A and signal carrying terminal T4 at a point along transmission line 84B, the RF differential circuit 80 can be used to attenuate the common mode component of an RF signal incident, for example, on I/O port P1, while simultaneously matching the differential mode component $Z_{DL}$ of a load impedance connected to I/O port P2 to the differential mode component $Z_{DS}$ of a source impedance connected to I/O port P1 where the differential mode component of the load impedance $Z_{DL}$ is different to the differential mode component of the source impedance $Z_{DS}$.

Equations 14A and 14B give expressions for the required capacitances of capacitors 86A, 86B and 87 for the embodiment of the present invention shown in FIG. 8 in order that the circuit 80 have the required properties, i.e. the differential mode component of an electrical signal incident on I/O port P1 is passed substantially without attenuation to I/O port P2 of the electronic circuit, and the common mode component of the impedance of I/O port P2 of the electronic circuit is zero Ω, so that the common mode component of an electrical signal incident on I/O port P1 is blocked from I/O port P2; similarly the differential mode component of an RF signal incident on I/O port P2 is passed substantially without attenuation to I/O port P1, and the common mode component of an RF signal incident on I/O port P2 is blocked from I/O port P1.

$$C_{86A} = C_{86B} = \frac{1}{\omega Z_0}\cot\left(\frac{2\pi}{\lambda}L\right) \quad \text{EQUATION 14A}$$

$$C_{87} = \frac{2}{\omega Z_0}\cot\left[\frac{2\pi}{\lambda}(L-e)\right] \quad \text{EQUATION 14B}$$

where $Z_0$ and L are the respective characteristic impedances and the physical lengths of both transmission lines 84A and 84B, where $C_{86A}$, $C_{86B}$ and $C_{87}$ are the capacitances of capacitors 86A, 86B and 87 respectively, where ω is the angular frequency of a signal in the centre of the operating band of the circuit, and λ is the wavelength of that signal.

Equation 14C gives an approximate relationship between the physical length L, the distance e, the differential mode component $Z_{DS}$ of the source impedance connected to I/O port P1 and the differential mode component of the load impedance $Z_{DL}$ connected to I/O port P2 of the RF differential circuit 80, of FIG. 8.

$$\frac{Z_{DL}}{Z_{DS}} \approx \left[\frac{(L-e)}{L}\right]^2 \quad \text{EQUATION 14C}$$

Figure 9A:
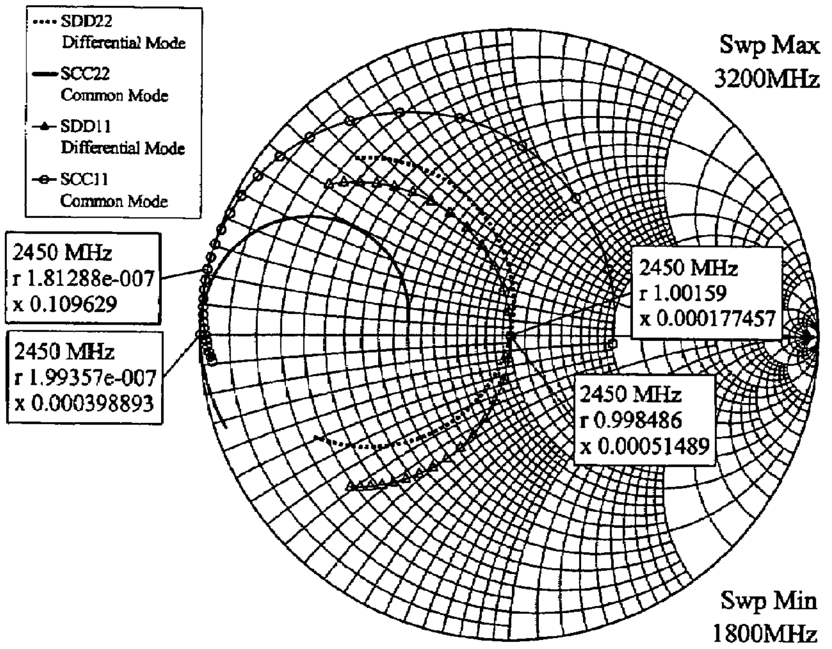
FIG. 9A shows exemplary differential mode reflection coefficients at port P1 and P2 ($S_{DD11}$ and $S_{DD22}$) and common mode reflection coefficients at ports P1 and P2 ($S_{CC11}$ and $S_{CC22}$) for the circuit of FIG. 8.

FIG. 9A shows a Smith chart plot of the differential mode reflection coefficients at I/O ports P1 and P2 ($S_{DD11}$ and $S_{DD22}$) and the common mode reflection coefficients at I/O ports P1 and P2 ($S_{CC11}$ and $S_{CC22}$) of RF differential circuit 80 with the following electrical properties: the source impedance connected to I/O port P1 has a differential mode component of 100Ω and a common mode component of 25Ω the load impedance at I/O port P2 has a differential mode component of 50Ω and a common mode component of 12.5Ω; the capacitances of capacitors 86A, 86B and 87 are given by the expression below $C_{86A}=C_{86B}=5$ pF and $$\frac{C_{87}}{2} = 6.95 \text{ pF},$$

where $C_{86A}$, $C_{86B}$ and $C_{87}$ are the capacitances of capacitors 86A, 86B and 87 respectively; transmission lines 84A and 84B of RF differential circuit 80 both have characteristic impedances of 50Ω, and electrical lengths of 15° at an operating frequency of 2.45 GHz; signal carrying terminal T3 is connected at a point along transmission line 84A which is at a distance e of 4.4° from first circuit node 83A (where the distance e is given in units of the phase of an RF signal with a frequency of 2.45 GHz) and signal carrying terminal T4 is connected at a point along transmission line 84B the same distance from second circuit node 83B.

It can be seen from FIG. 9A that the common mode impedance measured at I/O port P2 of RF differential circuit 80 is zero Ω at a frequency of 2.45 GHz. Similarly, it can be seen that the differential mode impedance measured at port P1 is matched to the differential mode component of the source impedance, and that the differential mode impedance of the RF differential circuit 80 measured at I/O port P2 is matched to the differential mode component of the load impedance.

Figure 9B:
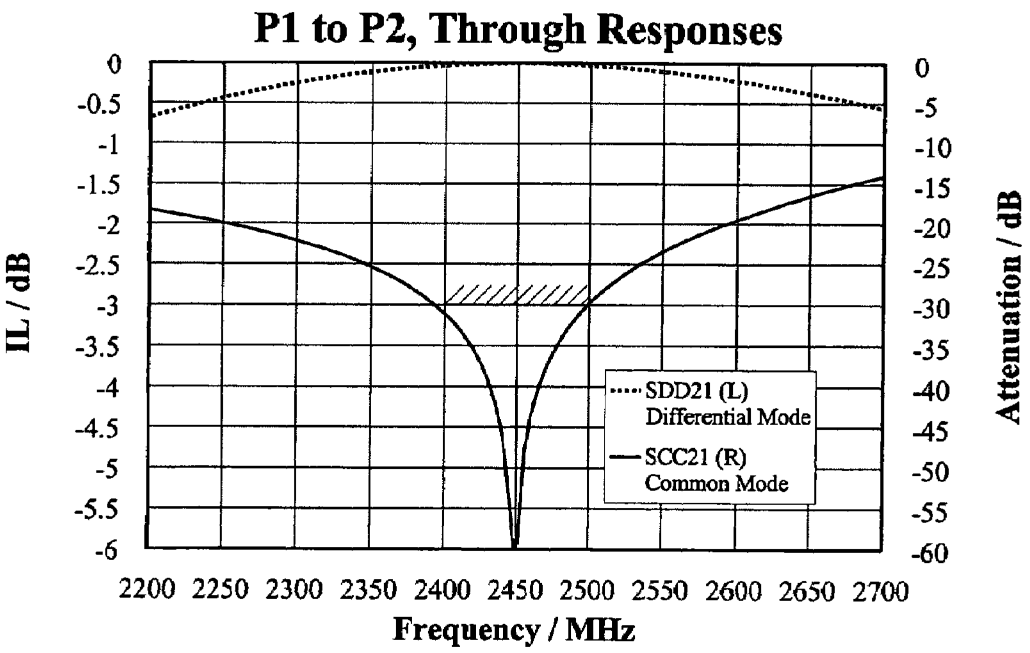
FIG. 9B shows an exemplary differential mode response and common mode response for the circuit of FIG. 8.

FIG. 9B shows a the differential mode response ($S_{DD21}$) and the common mode response ($S_{CC21}$) from I/O port P1 to I/O port P2 of RF differential circuit 80 of FIG. 8. The circuit conditions which apply for FIG. 9A also apply for FIG. 9B.

So far it has been assumed that the frequency at which the common mode impedance of the circuit of the present invention is zero is the same as the frequency at which the differential mode impedance is matched to the impedance of the source and to the impedance of the load. In fact there are applications where a circuit is required to pass a differential mode component of an RF signal at a frequency $f_1$, and to attenuate a common mode component of an RF signal at a frequency $f_2$.

The circuit of FIG. 5 can be adjusted to pass a differential mode component of an incident RF signal at a frequency $f_1$ and to attenuate a common mode component of an RF signal at a frequency at a frequency $f_2$ if the capacitances of capacitors 56A, 56B and 57 are related to the other circuit parameters by EQUATIONS 15A and 15B.

$$C_{56A} = C_{56B} = \frac{1}{\omega_1 Z_0}\cot\left(\frac{2\pi}{\lambda}L\right) \quad \text{EQUATION 15A}$$

$$C_{57} = \frac{2}{\omega_2 Z_0}\cot\left[\frac{2\pi}{\lambda}L\right] \quad \text{EQUATION 15B}$$

where $\omega_1$ is the angular frequency at which the differential mode component of the signal is to be passed by the circuit, and $\omega_2$ is the angular frequency at which the common mode component of the signal is to be attenuated by the circuit.

The circuit of FIG. 8 can be also adjusted to pass a differential mode component of an incident RF signal at a frequency $f_1$ and to attenuate a common mode component of an RF signal at a frequency at a frequency $f_2$ if the capacitances of capacitors 86A, 86B and 87 are related to the other circuit parameters by EQUATIONS 16A and 16B.

$$C_{86A} = C_{86B} = \frac{1}{\omega_1 Z_0}\cot\left(\frac{2\pi}{\lambda}L\right) \quad \text{EQUATION 16A}$$

$$C_{87} = \frac{2}{\omega_2 Z_0}\cot\left[\frac{2\pi}{\lambda}(L-e)\right] \quad \text{EQUATION 16B}$$

Such a circuit might be required, for example, in an application wherein a first circuit provides a substantially differential mode output signal within a frequency band A, but which provides an unwanted common mode output signal at a frequency band B (for example where frequency band B is substantially a harmonic of frequency band A). The circuit 50 of FIG. 5 or the circuit 80 of FIG. 8 can be employed in such an application where capacitances $C_{56A}$, $C_{56B}$, $C_{57}$, $C_{86A}$, $C_{86B}$ and $C_{87}$ are given by equations 15 and 16.

Figure 10:
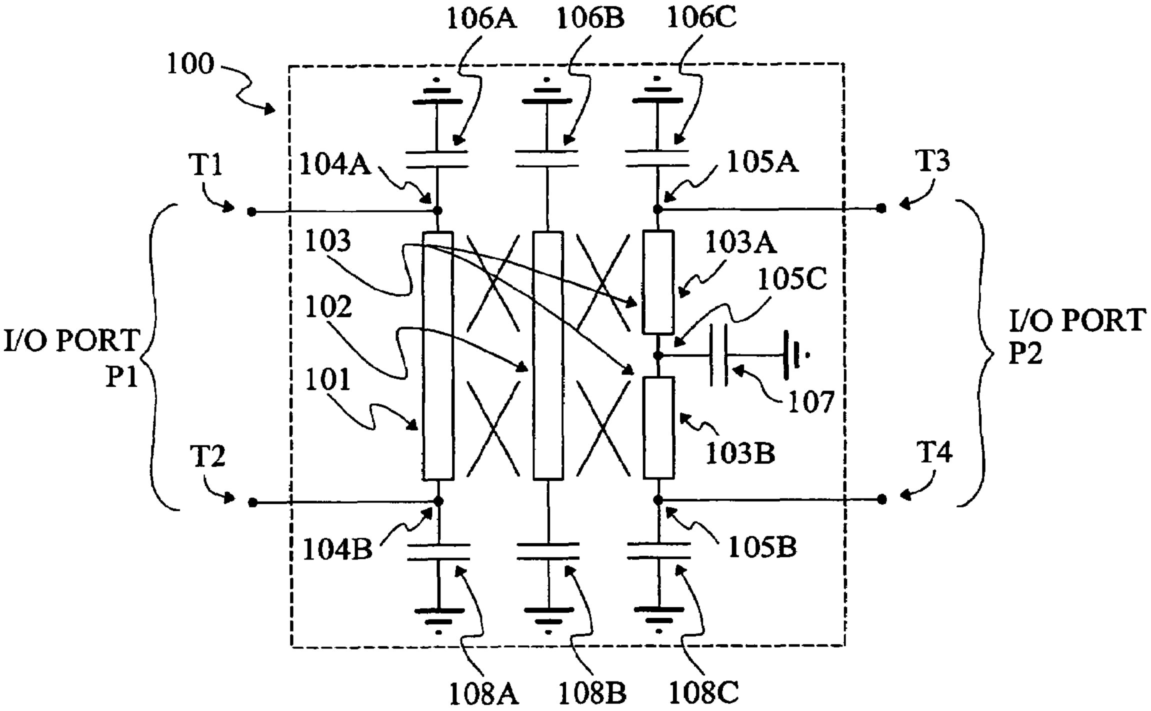
FIG. 10 shows a coupled line differential filter with high common mode attenuation according to a further embodiment of the present invention.

FIG. 10 shows an RF filter 100 according to a third embodiment of the present invention. RF filter 100 comprises a differential I/O port P1 and a differential I/O port P2, where I/O port P1 comprises two signal carrying terminals T1, T2 and where I/O port P2 comprises two signal carrying terminals T3 and T4. RF filter 100 further comprises three coupled transmission lines 101, 102 and 103, where coupled transmission line 103 is divided into two sections, 103A and 103B. A first end of coupled transmission line 101 is connected to signal carrying terminal T1 and to shunt capacitor 106A at a first circuit node 104A. A second end of coupled transmission line 101 is connected to signal carrying terminal T2 and to shunt capacitor 108A at a second circuit node 104B. A first end of coupled transmission line 102 is connected to shunt capacitor 106B and a second end of coupled transmission line 102 is connected to shunt capacitor 108B. A first end of coupled transmission line section 103A is connected to signal carrying terminal T3 and to shunt capacitor 106C at a third circuit node 105A. A first end of coupled transmission line section 103B is connected to signal carrying terminal T4 and to shunt capacitor 108C at a fourth circuit node 105B. A second end of coupled transmission line section 103A and a second end of coupled transmission line section 103B are connected together at fifth circuit node 105C; shunt capacitor 107 is also connected to fifth circuit node 105C.

The section of RF filter 100 comprising capacitors 106C and 108C, and coupled transmission line sections 103A and 103B is symmetric about fifth circuit node 105C, so that the capacitances of capacitors 106C and 108C are substantially equal, and so that the electrical lengths and characteristic impedances of coupled transmission line sections 103A and 103B are substantially equal.

The RF filter 100 of FIG. 10 has an operating band defined by a lower frequency limit $F_L$ and an upper frequency limit $F_U$. Coupled transmission lines 101, 102 and 103 have an electrical length which is substantially less than 180° at the centre of the operating band of the RF filter 100. Shunt capacitors 106A, 106B, 106C, 108A, 108B, and 108C have the effect of loading coupled transmission lines 101, 102 and 103. Hence the combination of coupled transmission to line 101 connected to shunt capacitor 106A at a first end and to shunt capacitor 108A at a second end, is electrically equivalent to a coupled transmission line which has an electrical length of 180° (one half wavelength) at the centre of the operating band of the circuit. Similarly, the combination of coupled transmission line 102 connected to shunt capacitor 106B at a first end and connected to shunt capacitor 108B at a second end is electrically equivalent to a coupled transmission line which has an electrical length of 180°. Furthermore, the combination of coupled transmission line section 103A connected to shunt capacitor 106C at a first end is electrically equivalent to a coupled transmission line section which has an electrical length of 90° (one quarter wavelength) at the centre of the operating band of the circuit and the combination of coupled transmission line section 103B connected to shunt capacitor 108C at a first end is also electrically equivalent to a coupled transmission line section which has an electrical length of 90° (one quarter wavelength) at the centre of the operating band of the circuit.

The capacitance of shunt capacitor 107 is selected so that the common mode impedance of the filter measured at I/O port P2 of the RF filter 100 is substantially zero Ω at the centre of the operating band of RF filter 100. Thus the capacitances of capacitors 106C, 108C and 107 are related by the expression given in EQUATION 17.

$$C_{106C} = C_{108C} = \frac{C_{107}}{2} \qquad \text{EQUATION 17}$$

where $C_{106C}$, $C_{108C}$ and $C_{107}$ are the capacitances of capacitors 106C, 108C and 107 respectively.

Figure 11:
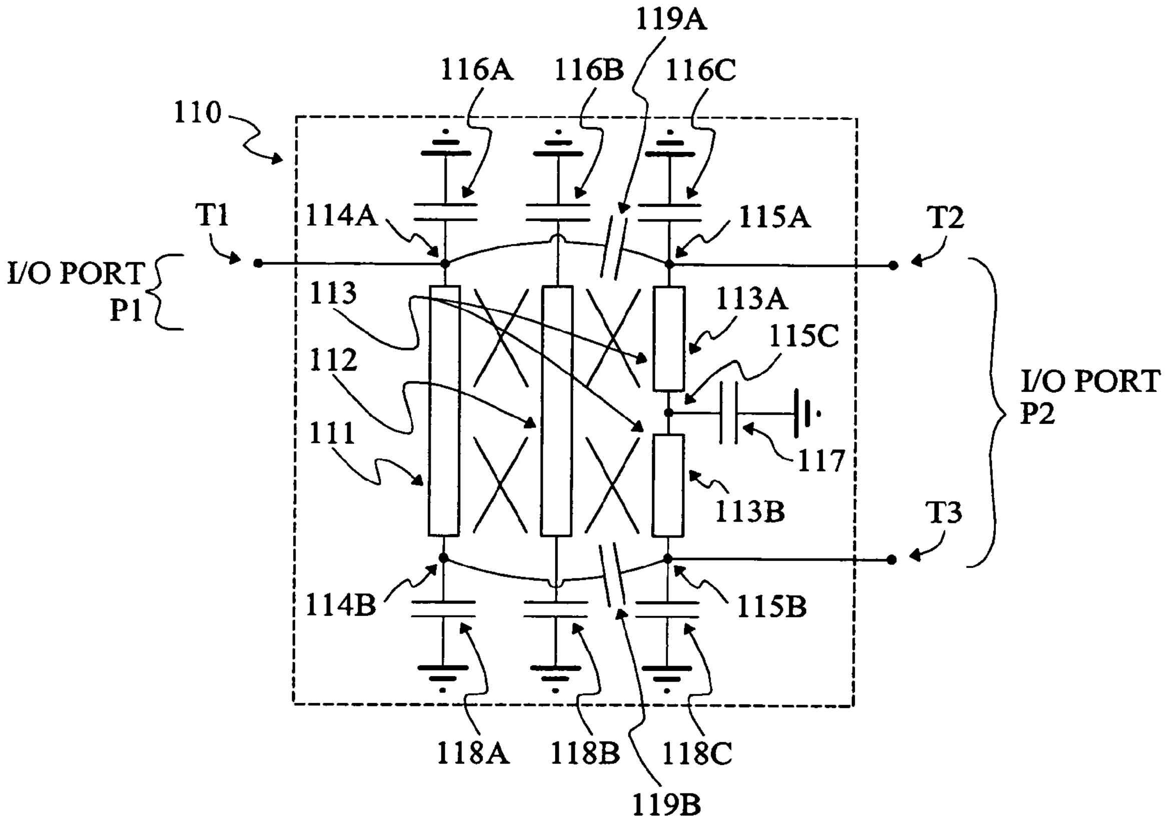
FIG. 11 shows a coupled line single-ended input to differential output filter with high common mode attenuation according to a still further embodiment of the present invention.

FIG. 11 shows an RF filter 110 according to a fourth embodiment of the present invention. RF filter 110 comprises a single-ended I/O port P1 and a differential I/O port P2, where I/O port P1 comprises signal carrying terminal T1 and where I/O port P2 comprises a pair of signal carrying terminals T2 and T3. RF filter 110 further comprises three coupled transmission lines 111, 112 and 113, where coupled transmission line 113 is divided into two sections, 113A and 113B.

A first end of coupled transmission line 111 is connected to shunt capacitor 116A and to signal carrying terminal T1 at a first circuit node 114A. A second end of coupled transmission line 11 is connected to shunt capacitor 118A at a second circuit node 114B. A first end of coupled transmission line 112 is connected to shunt capacitor 116B and a second end of coupled transmission line 112 is connected to shunt capacitor 118B. A first end of coupled transmission line section 113A is connected to shunt capacitor 116C and to signal carrying terminal T2 at a third circuit node 115A. A first end of coupled transmission line section 113B is connected to shunt capacitor 118C and to signal carrying terminal T3 at a fourth circuit node 115B. A second end of coupled transmission line section 113A and a second end of coupled transmission line section 113B are connected together at a fifth circuit node 115C; shunt capacitor 117 is also connected to fifth circuit node 117.

The section of RF filter 110 comprising capacitors 116C and 118C, and coupled transmission line sections 113A and 113B is symmetric about fifth circuit node 115C, so that the capacitances of capacitors 116C and 118C are substantially equal, and so that the electrical lengths and characteristic impedances of coupled transmission line sections 113A and 113B are substantially equal.

The RF filter 110 of FIG. 11 has an operating band defined by a lower frequency limit $F_L$ and an upper frequency limit $F_U$. Coupled transmission lines 111, 112 and 113 each have an electrical length which is substantially less than 180° (one half wavelength) at the centre of the operating band of the RF filter 110. Shunt capacitors 116A, 116B, 116C, 118A, 118B, and 118C have the effect of loading coupled transmission lines 111, 112 and 113, so that the combination of coupled transmission line 111 and shunt capacitors 116A and 118A is electrically equivalent to a coupled transmission line with an electrical length of 180°, so that the combination of coupled transmission line 112 and shunt capacitors 116B and 118B is electrically equivalent to a coupled transmission line with an electrical length of 180° and so that the combination of coupled transmission line 113 and shunt capacitors 116C and 118C is electrically equivalent to a coupled transmission line with an electrical length of 180°.

The capacitance of shunt capacitor 117 is selected so that the common mode impedance of the coupled-line bandpass filter 110 measured at I/O port P2 is substantially zero Ω at the centre of the operating band of coupled-line bandpass filter 110. Thus the capacitances of capacitors 116C, 118C and 117 are related by the EQUATION 17.

$$C_{116C} = C_{118C} = \frac{C_{117}}{2} \qquad \text{EQUATION 17}$$

where $C_{116C}$, $C_{118C}$ and $C_{117}$ are the capacitances of capacitors 116C, 118C and 117 respectively.

Feedback capacitors 119A and 119B are connected between first and third circuit nodes 114A and 115A and between second and fourth circuit nodes 114B and 115B respectively. The capacitances of feedback capacitors 119A and 119B are selected to introduce a resonance pole in the differential mode response of the coupled-line bandpass filter 110 at a frequency below the passband.

It will be seen that rather than using a transmission line as a phase shifting device as in the embodiments described above, the invention can also be implemented using an inductance as a phase shifting device.

It will be seen that the circuit of the embodiment of FIG. 10 can also be adapted in a manner corresponding to the circuit of FIG. 8, so that this circuit can be used to attenuate the common mode component of an RF signal incident, on I/O port P1, while simultaneously matching the differential mode component of a load impedance connected to I/O port P2 to the differential mode component of a source impedance connected to I/O port P1 where the differential mode component of the load impedance is different to the differential mode component of the source impedance.

It will be seen that the circuit of the embodiment of FIG. 11 can also be adapted in a manner corresponding to the circuit of FIG. 8, so that the common mode component of an RF signal emitted from I/O port P2 will be substantially less than the differential mode component of the signal, while simultaneously matching the differential mode component of an arbitrary load impedance connected to I/O port P2 to a single-ended impedance connected to I/O port P1.

The invention claimed is:

1. An RF circuit having at least one selected operating frequency and comprising:

a first I/O port for connection to a source termination by at least one first signal carrying terminal;

a second differential I/O port for connection to a load termination by a pair of second signal carrying terminals;

a phase shifting device having an electrical length substantially less than 180° at a selected differential mode operating frequency, said phase shifting device comprising a first section and a second section, each section comprising a first end and a second end, each of said at least one first signal carrying terminal being coupled to a respective first end of a section of said phase shifting device, each of said pair of second signal carrying terminals being connected to a respective section of said phase shifting device, and said second ends of said sections being connected together at a circuit node;

a first loading shunt device connected to said first end of said first section;

a second loading shunt device connected to said first end of said second section, said first and said second loading shunt devices having a capacitance, $C_A$ of:

$$C_A = \frac{1}{\omega_1 Z_0}\cot\left(\frac{2\pi}{\lambda}L\right);$$

where $Z_0$ is the characteristic impedance of the phase shifting device

L is the physical length of the phase shifting device, $\omega_1$ is the angular frequency of a signal at said selected differential mode operating frequency in which a differential mode component of a signal at said differential mode operating frequency is to be passed by the circuit, and $\lambda$ is the wavelength corresponding to $\omega_1$; and a capacitive element connected at said circuit node and having a capacitance $C_B$ of:

$$C_B = \frac{2}{\omega_2 Z_0}\cot\left[\frac{2\pi}{\lambda}(L-e)\right]$$

where $\omega_2$ is the angular frequency of a signal at a selected common mode operating frequency in which a common mode component of a signal at said common mode operating frequency is to be attenuated by the circuit, and e is the length between said first end and a point along the section of said phase shifting device to which respective second signal carrying terminals are connected.

2. An RF circuit according to claim 1 wherein said phase shifting device comprises a transmission line divided into two sections.

3. An RF circuit according to claim 1 wherein the common mode impedance measured at one of said I/O ports at said common mode operating frequency of said circuit is substantially zero.

4. An RF circuit according to claim 1 wherein the first I/O port comprises a single I/O port for connection to a source terminal by a single signal carrying terminal.

5. An RF circuit according to claim 1 wherein $\omega_1=\omega_2$ and e=0 so that $$C_A = \frac{C_B}{2}.$$

6. An RF circuit according to claim 1 wherein each of said at least one first signal carrying terminal is electrically connected to a respective first end of a section of said phase shifting device.

7. An RF circuit according to claim 1 wherein each of said at least one first signal carrying terminal is coupled to a respective first end of a section of said phase shifting device through one or more mutually coupled transmission lines, one of said mutually coupled transmission lines being coupled to said phase shifting device and each of said transmission lines having an electrical length substantially less than 180° at said differential mode operating frequency.

8. An RF circuit according to claim 7 wherein each of said at least one first signal carrying terminal is electrically connected to a respective end of a first transmission line of said plurality of transmission lines.

9. An RF circuit according to claim 8 wherein each end of said mutually coupled transmission lines is connected to a respective loading shunt device having a capacitance $C_A$.

10. An RF circuit according to claim 1 wherein the first I/O port comprises a differential I/O port for connection to a source termination by a pair of first signal carrying terminals.

11. An RF circuit according to claim 10 wherein the differential mode impedance measured at said first differential I/O port is substantially matched to a differential mode component of said source termination so that a resulting signal emitted from said second I/O port of said circuit has a differential mode component which is substantially greater than the common mode component.

12. An RF circuit according to claim 10 wherein the differential mode impedance measured at said second differential I/O port is substantially matched to the differential mode component of said load termination so that a resulting signal emitted from said first I/O port of said circuit has a differential mode component which is substantially greater than the common mode component.

13. An RF circuit according to claim 10 wherein said differential mode impedance of said load termination is equal to said differential mode impedance of said source termination and wherein said pair of second signal carrying terminals are connected to respective first ends of said sections of said phase shifting device so that e is equal to 0.

14. An RF circuit according to claim 10 wherein said differential mode impedance of said load termination is a multiple of said differential mode impedance of said source termination.

15. An RF circuit according to claim 10 wherein the lengths L and e and the differential mode component $Z_{DS}$ of the source impedance connected to I/O port P1 and the differential mode component of the load impedance $Z_{DL}$ connected to I/O port P2 of the RF differential circuit are:

$$\frac{Z_{DL}}{Z_{DS}} \approx \left[\frac{(L-e)}{L}\right]^2.$$

* * * * *